(12) United States Patent
Geurtsen et al.

(10) Patent No.: US 7,795,337 B2
(45) Date of Patent: Sep. 14, 2010

(54) LIQUID RHEOLOGICAL ADDITIVE SUITABLE FOR THICKENING SOLVENT BORNE, PIGMENT CONTAINING SYSTEM

(75) Inventors: Richard Alexander Geurtsen, Robbinsville, NJ (US); Eduardus Maria Mangnus, Deventer (NL)

(73) Assignee: Elementis Specialties, Inc., Hightstown, NJ (US)

( * ) Notice: Subject to any disclaimer, the term of this patent is extended or adjusted under 35 U.S.C. 154(b) by 430 days.

(21) Appl. No.: 11/394,942

(22) Filed: Mar. 31, 2006

(65) Prior Publication Data

US 2007/0055001 A1    Mar. 8, 2007

Related U.S. Application Data

(60) Provisional application No. 60/714,945, filed on Sep. 7, 2005.

(51) Int. Cl.
  *C08G 18/42*   (2006.01)
  *C08G 63/00*   (2006.01)
  *C10M 169/04*  (2006.01)

(52) U.S. Cl. ............... 524/361; 525/32.1; 508/496; 524/362

(58) Field of Classification Search ............... 523/1, 523/455; 507/131; 524/196, 307, 361, 362; 44/280; 516/47; 525/32.1; 508/496
See application file for complete search history.

(56) References Cited

U.S. PATENT DOCUMENTS 3,077,424 A * 2/1963 Maker et al. ............. 428/445

(Continued)

FOREIGN PATENT DOCUMENTS

GB    2138428 A * 10/1984

OTHER PUBLICATIONS

Julie B. Zimmerman, Kim F. Hayes and Steven J Skerlos Influence of Ion Accumulation on the Emulsion Stability and Performance of Semi-Synthetic Metalworking Fluids. Environ. Sci. Technol. 2004, 38, 248-2490.*

(Continued)

*Primary Examiner*—Porfirio Nazario-Gonzalez
*Assistant Examiner*—Yate' K Cutliff
(74) *Attorney, Agent, or Firm*—Morgan, Lewis & Bockius LLP

(57) ABSTRACT

A thixotropy imparting composition. The composition comprises the reaction products of: one or more polyesters from one or more polyols having at least two hydroxyl moieties; and one or more polycarboxylic acids having at least two carboxylic acid moieties; and one or more basic compounds, wherein said polyesters have at least two active carboxylic acid moieties as end groups and at least a portion of said carboxylic acid moieties are in the carboxylate anion form. This composition may further comprise one or more diluents. The composition exists as a liquid. The composition may be used in a non-aqueous fluid system as a rheological additive in combination with one or more particulate materials, wherein said rheological additive imparts thixotropy to said system.

A thixotropy imparting composition. The composition comprises the reaction products of: one or more polyesters from one or more polyols having at least two hydroxyl moieties; and one or more polycarboxylic acids having at least two carboxylic acid moieties; wherein said polyesters have at least two active carboxylic acid moieties as end groups. This composition may further comprise one or more diluents. The composition may exist as a liquid. The composition may be used in a non-aqueous fluid system as a rheological additive in combination with one or more particulate materials, wherein said rheological additive imparts thixotropy to said system.

21 Claims, 1 Drawing Sheet

U.S. PATENT DOCUMENTS

| | | | |
|---|---|---|---|
| 3,763,065 A | | 10/1973 | Herrmann |
| 4,101,517 A | * | 7/1978 | Ort .............................. 528/271 |
| 4,154,774 A | * | 5/1979 | Hinterwaldner .............. 525/15 |
| 4,424,333 A | * | 1/1984 | O'Connor et al. ............. 528/75 |
| 4,715,866 A | * | 12/1987 | Staker et al. .................. 44/280 |
| 5,510,452 A | | 4/1996 | Santhanam |
| 5,536,871 A | | 7/1996 | Santhanam |
| 5,723,653 A | * | 3/1998 | Santhanam ................. 560/196 |
| 6,043,300 A | * | 3/2000 | Santhanam ................. 523/455 |
| 6,339,048 B1 | | 1/2002 | Santhanam |

OTHER PUBLICATIONS

DeRuiter, Carboxylic Acid Structure and Chemistry: Part 1, spring 2005, Principles of Drug Action 1, pp. 1-11.*
Search Report from PCT/US06/34172, filed Aug. 31, 2006.
Extended Search Report for Application No. 09000909.3-2102/2083036; 7 pages. Oct. 7, 2009.

* cited by examiner

US 7,795,337 B2

LIQUID RHEOLOGICAL ADDITIVE SUITABLE FOR THICKENING SOLVENT BORNE, PIGMENT CONTAINING SYSTEM

RELATED APPLICATIONS

This application claims the benefit of U.S. Patent Application No. 60/714,945 filed Sep. 7, 2005 entitled "Liquid Rheological Additive Suitable for Thickening Solvent Borne, Pigment-Containing Systems" which is incorporated by reference in its entirety.

FIELD OF INVENTION

The invention herein is directed to a polyester composition having improved rheological additive properties for non-aqueous compositions and systems, including paints, coatings, adhesives, sealants, inks, varnishes, drilling fluids and the like.

SUMMARY

In one embodiment, the present invention provides for a thixotropy imparting composition comprising the reaction products of: one or more polyesters from one or more polyols having at least two hydroxyl moieties; and one or more polycarboxylic acids having at least two carboxylic acid moieties; and one or more basic compounds, wherein the polyesters have at least two active carboxylic acid moieties as end groups and at least a portion of the carboxylic acid moieties are in the carboxylate anion form. In one embodiment, this composition may further include one or more diluents. In one embodiment, the composition may further exist in the liquid state.

In a second embodiment, the present invention further provides for a non-aqueous fluid system comprising: a rheological additive comprising: one or more polyesters including the reaction products of: one or more polyols having at least two hydroxyl moieties; and one or more polycarboxylic acids having at least two carboxylic acid moieties; and one or more basic compounds, wherein the polyesters have at least two active carboxylic acid moieties as end groups and at least a portion of the carboxylic acid moieties are in the carboxylate anion form; and one or more particulate materials, wherein the rheological additive imparts thixotropy to the system. In one embodiment, the rheological additives of this invention may further comprise one or more diluents.

In another embodiment of the present invention provides for a thixotropy imparting composition comprising the reaction products of: one or more polyesters from one or more polyols having at least two hydroxyl moieties; and one or more polycarboxylic acids having at least two carboxylic acid moieties; wherein the polyesters have at least two active carboxylic acid moieties as end groups. In one embodiment, carboxylic acid moieties are in the carboxylate anion form. In one embodiment, the composition may further include one or more diluents. In one embodiment, the composition may further exist as a liquid.

In another embodiment, the present invention further provides for a non-aqueous fluid system comprising: a rheological additive comprising: one or more polyesters included of the reaction products of: one or more polyols having at least two hydroxyl moieties; and one or more polycarboxylic acids having at least two carboxylic acid moieties; wherein the polyesters have at least two active carboxylic acid moieties as end groups; and one or more particulate materials, wherein the rheological additive imparts thixotropy to the system. In one embodiment, carboxylic acid moieties are in the carboxylate anion form. In one embodiment, the rheological additive of this invention may further include one or more diluents.

BRIEF DESCRIPTION OF THE DRAWINGS

The accompanying drawing, which is included to provide further understanding of the invention and is incorporated in and constitutes a part of this specification, illustrates an embodiment of the invention and, together with the description, serve to explain the principles of the invention.

In the drawings.

DESCRIPTION OF THE EMBODIMENTS

Figure 1:
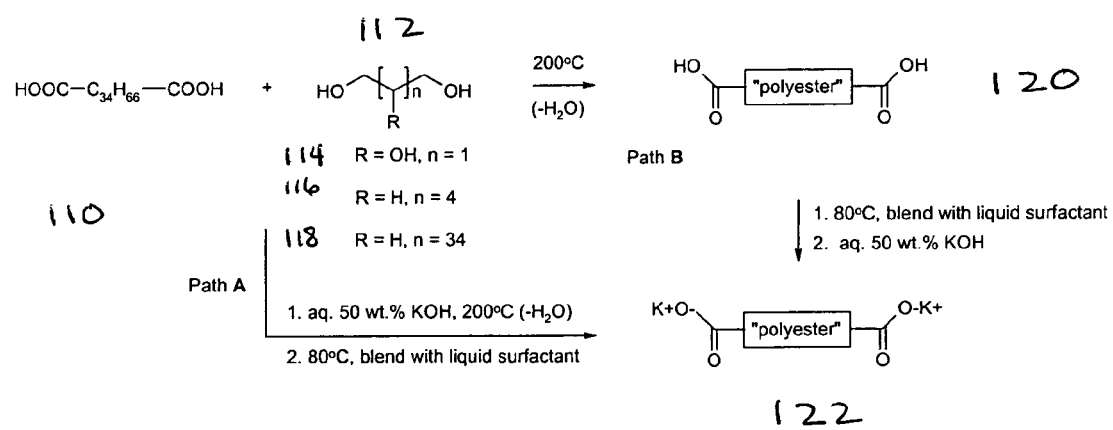
FIG. 1 illustrates synthetic pathways that may be used to synthesize the compositions of the present invention.

Reference will now be made in detail to the embodiments of the present invention. The compositions and systems of the present invention may be made using a variety of materials and by a variety of methods either disclosed herein, or which will appear obvious to those of skill in the art. Applicants do not intend to limit the materials or methods of manufacture of such compositions by the following descriptions.

This invention describes a polyester composition which may be used as a rheological additive. The polyester composition is pourable at ambient temperatures, and provides effective and efficient thixotropic properties when used at low levels in nonaqueous systems. Unlike prior additives, this rheological additive is nearly completely rheologically active and efficient, and does not require a diluent to maintain a liquid state. The present invention also covers improved organic and solvent systems containing such rheological additives. The term non-aqueous system is used herein to include both solvent free and solvent containing compositions.

With Reference to FIG. 1, the polyester compositions of the present invention may be synthesized by exemplary synthetic pathways A and B. In exemplary pathway A, a polycarboxylic acid 110, polyol 112 and basic compound are reacted with each other in a condensation reaction conducted at elevated temperature. In one embodiment, the polyol hydroxyl moiety to polycarboxylic acid moiety stoichiometric is set so the reaction mixture will not extensively crosslink and prevent formation of a gel. This stoichiometry may be determined experimentally or, more preferably, theoretically by use of, e.g., the Carothers equation or variant thereof. In one embodiment, the ratio of hydroxyl moieties from the polyol to carboxylic acid moieties preferably ranges from 1.5:1.0 to 3.0:1.0, more preferably ranges from 2.1:1.0 to 2.7:1.0, and most preferably ranges from 2.45:1.0 to 2.65:1.0. In pathway A, the basic compound is added at the start of the reaction. While not bound to theory, it is believed that the basic compound prevents both, extensive cross-linking and the formation of a high molecular weight polymer. In one embodiment, the molecular weight range for a polyester made via synthetic pathway A is in the range of 1,000 to 30,000 Daltons, preferably 1,000-15,000 Daltons as determined by gel permeation chromatography. In one embodiment, the polyester composition 122 made via synthetic pathway A is obtained as a thick liquid having a viscosity ranging from 500,000-600,000 cP at 23° C.

In exemplary pathway B, the polyol is first reacted with the polycarboxylic acid 110 to give an acid-terminated polyester 120. The polyester is terminated at each end with a carboxylic acid moiety. The resulting polyester may be subsequently blended with liquid surfactant to reduce its viscosity and/or may be neutralized with a basic compound. In one embodiment, a preferred ratio of carboxylic acid moieties to hydroxyl moieties ranges from 2:1 to 18:17. In one embodiment, for difunctional reactants, a preferred range of carboxylic acid moieties to hydroxyl moieties is about 6:5. In one embodiment, for higher functionality reactants, a ratio of carboxylic acid moieties and hydroxyl moieties are selected such that the resulting polymer will contain free carboxylic acid moieties and will not be cross linked into an insoluble, intractable mass. In one embodiment, the molecular weight range for the composition of this disclosure is in the range of 2000 to 10,000 Daltons, preferably 4000-8000 Daltons. In one embodiment, a polyester composition made via synthetic pathway B, has a viscosity ranging from 40,000-80,000 cP at 23° C.

Polyols used in the compositions of the present invention include straight chain and branched chain polyols having two or more hydroxyl moieties and mixtures thereof. In one preferred embodiment, the polyol preferably has from two to six hydroxyl moieties and mixtures thereof. In a most preferred embodiment, the polyol has from two to three hydroxyl moieties and mixtures thereof. Exemplary polyols include glycerol, sorbitol, ethylene glycol, diethylene glycol, 1,6-hexanediol, C36 dimer diol, polyester diols such as PRIPLAST™ from Uniqema, polyethylene glycol, polypropylene glycol, polybutylene glycol, poly(THF), and ethoxylated amines such as ETHOMEEN® C15 (Polyoxyethylene (15) coconut alkylamine) from Akzo Chemical Company. In one embodiment, the polyol may include a polyol equivalent including epichlorohydrin and polyepoxide resins such as EPON™ resins (condensation polymers of epichlorohydrin) from Shell Chemicals, Ltd, which will react with the polyacid to form ester linkages. In a preferred embodiment the polyol includes glycerol. In another preferred embodiment, the polyol includes 1,6-hexanediol.

In one embodiment, polycarboxylic acids which may be used in the compositions of this invention may include polybasic acids having from 18 to 54 carbon atoms, and mixtures of such acids. In one embodiment, the polycarboxylic acids have at least 2, and up to 6, carboxylic acid moieties per molecule. In a preferred embodiment, polycarboxylic acids include dimers and trimers of C16 to C18 fatty acids having from two to three carboxylic acid moieties. Mixtures of polycarboxylic acids may also be used in this invention. The term "polycarboxylic acid" is meant to include polycarboxylic acid equivalents, such as esters of the polycarboxylic acids with lower alcohols, which esters will undergo trans-esterification reactions with the polyols to form the desired polyester, and use of acid halides and anhydrides which will react with the polyol to form the desired polyesters. In certain embodiments, the polyacid component includes a sulfosuccinic acid, it constitutes less than 30%, preferably less than 20%, most preferably less than 10% of the polyester composition.

In one embodiment, a preferred dimer and trimer polycarboxylic acid of the present invention has from 16 to 18 carbon atoms. Mixtures of such materials may also be employed. The dimer acids are commercially available under the trade name EMPOL® Dimer Acids from Cognis, and PRIPOL™ Dimer Acids (polymerised fatty acids) from Uniqema, International. Illustrative examples of useful dimer acids are EMPOL® 1004 (hydrogenated C36 dimer fatty acid), EMPOL® 1008 (hydrogenated C36 dimer fatty acid), EMPOL® 1018 (hydrogenated C18 fatty acids dimers and trimers), EMPOL® 1016 (hydrogenated C18 fatty acids dimers and trimers) and the like.

In one embodiment, basic compounds which may be used in the compositions of the present invention include any metal salt, ammonium ions, phosphonium ions, and mixtures thereof that will form a salt with the carboxylic acid or acid equivalent of the liquid polyester. In a preferred embodiment, basic compounds are selected from the group consisting of alkali metals (Group I) and alkaline earth (Group II) metals, including lithium, sodium, potassium, cesium, calcium, magnesium, and mixtures of these metal salts. In a more preferred embodiment, a basic compound useful in the present invention includes an alkali metal salt. In a most preferred embodiment, a basic compound useful in the present invention includes potassium salts and cesium salts and mixtures thereof.

In one embodiment, the anion of the basic compound may be selected from among any anions which will permit formation of a metal salt with carboxylic acid moieties of polyester in the present invention. In certain embodiments, an anion may include carbonates, alkoxylates, carboxylates, bicarbonates, hydrides, and hydroxides, and mixtures thereof. In one embodiment, a source of basic metal cation may be its elemental form, if the elemental metal is sufficiently active to react with carboxylic acid moieties.

In one embodiment, from 0.05 to 0.8 equivalents of a metal salt, such as alkali metal salt are used per equivalent of starting carboxylic acid moiety. In a preferred embodiment, from 0.1 to 0.5 equivalents of alkali metal salt are used per equivalent of starting carboxylic acid moiety. In a most preferred embodiment, from 0.2 to 0.4 equivalents of alkali metal salt are used per equivalent of starting carboxylic acid moiety. In this context, alkali means a material that will react with carboxylic acid moieties to form a salt. In one embodiment, a preferred source of basic compound, useful in the present invention, includes potassium hydroxide and cesium hydroxide.

In one embodiment, a composition of this invention may be diluted with a diluent to provide a pourable, liquid product with a viscosity, of about 20,000 cP at 23° C. In certain embodiments, diluent may include organic solvents, nonionic surfactants, triglycerides and other oils and high boiling alcohols. Exemplary organic solvents useful in the present invention include toluene, xylene, butyl Carbitol® (diethylene glycol butyl ether), butyl triglycol, hexyl triglycol, N-methyl pyrrolidone, ethyl acetate, butyl acetate, methyl ethyl ketone, and butanol and mixtures thereof. Exemplary nonionic surfactants useful in the present invention include polyethylene oxides, monoethers of C6 to C22 straight and branched, saturated and unsaturated alkyl groups, polyethylene oxides monoethers of alkylphenols and polyarylphenols, polyethylene oxides monoesters, triglycerides and other oils. Representative examples of petroleum solvents include MAGIESOL® 52 sold by Magie Bros., SUNPRINT HP 750 marketed by Sun Inc., and EXX-PRINT™ 705 sold by Exxon Chemical Company. Illustrative vegetable oils include but are not limited to soybean oil, rapeseed oil, canola oil, palm oil, rice bran oil and the like. An exemplary high boiling alcohol useful in the present invention includes Guerbet alcohols (alkylated dimer alcohols derived from Guerbet dimerization of primary aliphatic alcohols). In one embodiment, diluent preferably will not contribute significantly to the volatile organic content of the product.

In one embodiment of the present invention, a thixotropy imparting composition includes reaction product of: one or more polyesters from one or more polyols having at least two hydroxyl moieties; and one or more polycarboxylic acids having at least two carboxylic acid moieties; and one or more basic compounds where the polyesters have at least two active carboxylic acid moieties as end groups and at least a portion of the carboxylic acid moieties are in the carboxylate anion form. In one embodiment, a composition may further include one or more diluents. In one embodiment, the composition may include a liquid. In a preferred embodiment, the polyol includes glycerol. In another preferred embodiment, a basic compound includes potassium hydroxide. In another preferred embodiment, a basic compound includes cesium hydroxide.

In another embodiment of the present invention, a thixotropy imparting composition according to the present invention includes a reaction product of: one or more polyesters from one or more polyols having at least two hydroxyl moieties; and one or more polycarboxylic acids having at least two carboxylic acid moieties, where the polyesters have at least two active carboxylic acid moieties as end groups. In a preferred embodiment, the polyol includes 1,6-hexanediol. This composition may further include a diluent.

In one embodiment of the present invention, a thixotropy imparting composition includes a polyester and a basic compound wherein the polyester has at least two active carboxylic acid moieties as end groups and at least a portion of the carboxylic acid moieties are in the carboxylate anion form. In another embodiment, the polyester exists in a solid state. In a preferred embodiment, the polyester exists in a liquid state.

In yet another embodiment of the present invention, a thixotropy imparting composition includes a glycerol-dimer acid polyester composition having at least two active carboxylic acid moieties as end groups and at least a portion of the carboxylic acid moieties are in the carboxylate anion form with a potassium cation as a counterion. In another embodiment, the polyester exists in a solid state. In a preferred embodiment, the polyester exists in a liquid state.

In another embodiment of the present invention, a non-aqueous fluid system includes a rheological additive including: a glycerol-dimer acid polyester composition having at least two active carboxylic acid moieties as end groups and at least a portion of the carboxylic acid moieties are in the carboxylate anion form with a potassium cation as a counterion; and one or more particulate materials, wherein the polyester rheological additive imparts thixotropy to the system. In a preferred embodiment, the polyester has at least two active carboxylic acid moieties as end groups. In another embodiment, the rheological additive exists in a solid state. In a preferred embodiment, the rheological additive exists in a liquid state.

In yet another embodiment of the present invention, a thixotropy imparting composition includes 1,6-hexanediol-dimer acid composition having at least two active carboxylic acid moieties as end groups. In another embodiment, the polyester exists in a solid state. In a preferred embodiment, the polyester exists in a liquid state.

In another embodiment of the present invention, a non-aqueous fluid system includes a rheological additive including: 1,6-hexanediol-dimer acid composition having at least two active carboxylic acid moieties as end groups; and one or more particulate materials, wherein the polyester rheological additive imparts thixotropy to the system.

In one embodiment, the polyester compositions of the present invention may be used to impart thixotropy to the systems in which they are utilized. In one embodiment of the present invention, a non-aqueous fluid system includes a rheological additive including one or more polyesters including a reaction product of one or more polyols having at least two hydroxyl moieties; and one or more polycarboxylic acids having at least two carboxylic acid moieties; and one or more basic compounds, where the polyesters have at least two active carboxylic acid moieties as end groups and at least a portion of the carboxylic acid moieties are in the carboxylate anion form; and one or more particulate materials, where the rheological additive imparts thixotropy to the system. In a preferred embodiment, the polyol includes glycerol. In another preferred embodiment, the basic compound includes potassium hydroxide. In another preferred embodiment, a basic compound includes cesium hydroxide. In yet another embodiment, the polyester compositions of this invention may further include a diluent.

In another embodiment of the present invention, a non-aqueous fluid system includes a rheological additive including one or more polyesters including a reaction product of one or more polyols having at least two hydroxyl moieties; and one or more polycarboxylic acids having at least two carboxylic acid moieties; where the polyesters have at least two active carboxylic acid moieties as end groups; and one or more particulate materials, where the rheological additive imparts thixotropy to the system. In another embodiment, the residual carboxylic acid moieties of the polyester rheological additive may be neutralized with a basic compound. In a preferred embodiment, the polyol includes 1,6-hexanediol. In another embodiment, the polyester compositions of invention may further include a diluent.

In certain embodiments, particulate material may include of a variety of materials. Exemplary particulate materials useful in the present invention include: titanium dioxide, calcium carbonate, talc, alumina, layered silicates, fumed silica, various pigmentary material typically used in coatings, and mixtures thereof.

While not being bound to theory, it is believed that the functional groups of the rheological additive attach to the surface of a particulate and lead to an increase in rheology by network formation and control flocculation.

The rheological additives of the present invention offer certain advantages and/or improvement over known additives. The properties of the rheological additives are at least equal to previously known solid thixotropes. In one embodiment, when used, the additives may contain no solvent, or may optionally contain substantially reduced solvent. In one embodiment, organic or other solvents can be used at less than about 10 to 25% by weight, if convenient for either manufacture or use. In one embodiment, the rheological additives of the present invention have substantially improved properties over known additives. In contrast to some particulate-type rheological additives, the rheological additives of the present invention have excellent flow and leveling properties, as well as excellent efficiency and easy dispersion characteristics. Compared to recent solid rheological additives disclosed in the art, the rheological additives of this invention can be incorporated in the system as rheological liquids.

In certain embodiments, the liquid rheological additive of the present invention may be used to thicken a variety of organic and solvent-based compositions, In one embodiment, the rheological additives of the present invention may also be used in solvent-free compositions. In certain embodiments, rheological additives of the present invention are useful in non-aqueous solvents including non-aqueous polymer solutions such as, for example, a solution of an alkyd in mineral spirits, dispersions of polymers in non-aqueous media (called non-aqueous dispersions), and non-aqueous paints, paint strippers, adhesives, inks, sealants, mastics, caulks, pigment dispersions, and pigment printing pastes can be advantageously bodied, viscosified, or thickened, by this invention. In certain embodiment, rheological additive of the present invention are particularly useful, for example, in thickening aliphatic and aromatic solvent-based compositions, and may also be used in polar (ketones, alcohols, esters) based compositions. In certain embodiments, rheological additives according to the present invention can be used, for example, in illustrative organic compositions including aliphatic alkyd paints such as "trade sales" paints, varnishes, epoxy-based paint, polyesters, modified alkyd based paints and alkyd, polyester and acrylic bake enamels, such as standard quality industrial paints, certain sealants and thermoset systems such as unsaturated polyester resins formulations. In certain embodiments, rheological additives according to the present invention can be used, for example, in aromatic high solids bake enamels which include systems based on alkyd/melamine, acrylic/melamine, and polyester/melamine system including appliance enamels, and equipment enamels. Additionally, the rheological additives can be used in high solids air-dry enamels based on alkyd and modified alkyd formulations.

In addition to aliphatic and aromatic solvent-based systems, rheological additives of the present invention may also be used in petroleum-based and vegetable oil-based systems. Representative examples of petroleum solvents include MAGIESOL® 52 (Technical White Oil, CAS No. 8042-47-5) sold by Magie Bros., SUNPRINT HP 750 (severely hydrotreated, chemically neutralized, heavy Napthenic petroleum oil, CAS No. 64742-52-5; may contain solvent refined light paraffinic petroleum oil, CAS No. 64741-88-4) marketed by Sun Inc., and EXX-PRINT™ 705 (hydrocarbon fluids) sold by Exxon Chemical Company. Illustrative vegetable oils include but are not limited to soybean oil, rapeseed oil, canola oil, palm oil, rice bran oil and the like. In one embodiment, rheological additives of the present invention can be dispersed into the organic composition to provide improved viscosity characteristics. In one embodiment, the additive can be dispersed in the composition at any temperature normally used in their production.

The amount of rheological additive used in a specific instance is determined by numerous factors, including the type of the organic solvent-based composition to be thickened, and the level of thickening desired. On a weight basis, the amount of the rheological additive is generally from about 0.1 to about 1% by weight, preferably from about 0.1 to about 0.7% by weight, and more preferably from about 0.25 to about 0.5% by weight of the paint system. The rheological additive of this invention may also be used in combination with other rheological additives. As demonstrated in Table 13 of the examples, the liquid rheological additives are very efficient, and may be used at lower loading levels than most of the current rheological additives on the market today.

Rheological additives of the present invention can provide important advantages in a variety of organic coating compositions. In one embodiment of the present invention, the liquid rheological additives are pourable, pumpable liquids, and therefore easier to handle/monitor. The liquid rheological additives do not suffer from some of the safety issues that are associated with powdered products (e.g. dust) and dissolve or disperse readily in low volatility organic liquids, such as nonionic surfactants, which do not contribute VOC and do not lower the flash points of formulations in which the additives are incorporated. In one embodiment, the liquid rheological additives can be incorporated very easily into a variety of compositions at various stages of their preparation, as demonstrated in the following examples. In one embodiment, the liquid rheological additives can also be added at any stage of the formulation process, at the beginning of processing, during processing, or as a post-add ingredient.

In one embodiment, the liquid rheological additives of this invention will readily incorporate in High Solids non-aqueous paints. This is in contrast to prior art castorwax and polyamide additives which are powders and require solvent in the beginning of the mixing period. This is required to soften and swell their particles necessary for efficient and complete dispersion. If this process is not followed, castorwax and polyamide powders will cause seeding, the liquid rheological additives are non-seeding.

In one embodiment, the liquid rheological additives disperse very rapidly in the pigment grind and do not require lengthy premixes or high temperatures in high solids systems, unlike the castorwax and polyamide powders. In one embodiment, the liquid rheological additives appear to give better surface characteristics in many paint formulations due to better flow out.

As demonstrated in the following examples, the liquid rheological additives are more stable at elevated temperature storage based on aging test results conducted at 120° F. for 7 days. It is anticipated that final paint compositions, prepared with the liquid rheological additives, can be packed-off hot. This is unlike the prior art castorwax and polyamides which require lengthy cool down under agitation.

From a bake-coating point of view, it is anticipated that the liquid rheological additives will not demonstrate temperature sensitivity and will maintain sag control and edge coverage during the bake cycle. This is unlike the prior art castor-based products, THIXATROL® MAX, and organoclays that are not usable in bake (OEM type) coatings.

Other possible uses for the compositions of this invention are paint and coatings, inks, unsaturated polyester resins, oil based drilling fluids, including invert oil drilling muds, potting compounds, adhesives and sealants, etc.

EXAMPLES

The present invention is further defined in the following Examples, in which all parts and percentages are by weight, unless otherwise stated. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

Process A—Typical Preparation of Glycerol-Based, Polyester Soaps:

A 1 L, 4-neck, round-bottom flask, equipped with an overhead stirrer, a side-arm with reflux condenser and a Nitrogen inlet with thermometer was charged with EMPOL® 1008 dimer acid (297.4 g, 512.3 mmol), glycerol (80.2 g, 871.0 mmol) and aqueous 45 wt. % potassium hydroxide (25.6 g, 11.5 mmol). The mixture was stirred and a frothy, thick mass formed (temperature rise 23→32° C.). The mixture was heated and stirred at 200° C. under Nitrogen flow, and the progress of the reaction was followed by determination of the Acid Value. After a total reaction time of 4-5 h, the Acid Value had dropped from 114 to 3. The mixture was cooled down to 80° C., and blended with TWEEN® 85 (370.6 g). The mixture was stirred for 0.5 h at 80° C., discharged in a 32 oz. glass jar and stored until further use. The product was obtained as a homogeneous, clear, amber liquid with the following characteristics: Acid Value 2, Amine Value 16.9, η (Brookfield viscometer, model RVTD, 21° C., spindle 7, 30 sec at 20 RPM): 9,800 cP.

TABLE 1

Examples Prepared by Process A

| Example | Reagents | Equivalents |
|---|---|---|
| 4 | EMPOL ® 1008/glycerol/KOH[1] | 1:1.7:0.4 |
| 5 | EMPOL ® 1008/glycerol/Ca(OH)$_2$[1] | 1:1.7:0.2 |
| 6 | EMPOL ® 1008/gylcerol/CsOH[1] | 1:1.7:0.43 |
| 7 | EMPOL ® 1008/glycerol/LiOH[1] | 1:1.7:0.2 |
| 8 | EMPOL ® 1008/glycerol/Mg(OH)$_2$[1] | 1:1.7:0.1 |
| 11 | Unidyme 11/glycerol/K$_2$CO$_3$[1] | 1:1.8:0.17 |
| 12 | Unidyme 18/glycerol/K$_2$CO$_3$[1] | 1:1.74:0.17 |
| 13 | EMPOL ® 1008/glycerol/KOH[1] | 1:1.4:0.4 |
| 14 | PRIPOL ™ 1015/glycerol/KOH[1] | 1:1.8:0.4 |
| 15 | EMPOL ® 1008/glycerol/Potassium stearate[1] | 1:1.7:0.4 |
| 25 | EMPOL ® 1008/glycerol/KOH | 1:1.6:0.4 |
| 25b | EMPOL ® 1008/glycerol/KOH[1] | 1:1.6:0.4 |
| 51 | EMPOL ® 1008/glycerol/aluminum hydroxide[1] | 1/1.7/0.14 |
| 52 | EMPOL ® 1008/glycerol/magnesium hydroxide[1] | 1/1.7/0.2 |
| 53 | EMPOL ® 1008/glycerol/Potassium carbonate[1] | 1/1.75/0.18 |
| 54 | EMPOL ® 1008/glycerol/Sodium hydroxide[1] | 1/1.74/0.34 |
| 55 | EMPOL ® 1008/glycerol/Sodium stearate[1] | 1/1.9/0.25 |

[1] 50 wt % in Tween 85, a nonionic surfactant from Uniqema
[1] Resulted in a crosslinked gel; not further evaluated

TABLE 2

Comparative Examples

| 21 | EMPOL ® 1008/KOH | 1:0.4 |
|---|---|---|
| 22 | EMPOL ® 1008/KOH[1] | 1:0.4 |
| 23 | EMPOL ® 1008/KOH, blend with 1.6 equivalents glycerol | 1:0.4 |
| 24 | EMPOL ® 1008/KOH, blend with 1.6 equivalents glycerol | 1:0.4 |

Process B—Typical Preparation of Hexanediol-Based Polyester Soaps:

A 1 L, 4-neck, round-bottom flask, equipped with an overhead stirrer, a side-arm with reflux condenser and a Nitrogen inlet with thermometer was charged with EMPOL® 1008 dimer acid (312.0 g, 537.5 mmol), 1,6-hexanediol (52.9 g, 448.0 mmol), and 2 drops (0.1 mL) of an aqueous 85 wt. % solution of phosphoric acid. The mixture was stirred at 200° C. under Nitrogen flow, and the progress of the reaction was followed by determination of the Acid Value. After a total reaction time of 6 h, the Acid Value had dropped from 165 to 36. The mixture was cooled down to 80° C., blended with TOMADOL® 23-1 (347.5 g), and stirred for 0.5 h at 80° C. The mixture was further cooled down to 40° C., and subsequently (partially) neutralized with aqueous 45 wt. % potassium hydroxide (26.8 g, 215.3 mmol). The mixture was stirred for 1 h, discharged in a 32 oz. glass jar and stored until further use. The product was obtained as a homogeneous, clear, colorless liquid with the following characteristics: Acid Value 2, Amine Value 17, η (Brookfield viscometer, model RVTD, 22° C., spindle 7, 30 sec at 20 RPM): 2,000 cP.

TABLE 3

Examples Prepared by Process B

| Example | Reagents | Equivalents |
|---|---|---|
| 26 | EMPOL ® 1008/1,6-hexanediol/K$_2$CO$_3$ | 6/5/1[3] |
| 27 | EMPOL ® 1008/1,6-hexanediol/KOH | 6/5/2[4] |
| 28 | EMPOL ® 1008/1,6-hexanediol/KOH | 6/5/2[5] |
| 29 | EMPOL ® 1008/1,6-hexanediol/KOH | 6/5/2[6] |
| 30 | EMPOL ® 1008/1,6-hexanediol/KOH | 6/5/2[7] |
| 34 | EMPOL ® 1008/1,6-hexanediol/KOH | 6/5/1.2[5] |
| 35 | EMPOL ® 1008/Pripol 2033/KOH | 6/5/1.94[8] |
| 60 | EMPOL ® 1008/1,6-hexanediol/KOH | 6/5/1.2[9] |
| 61 | EMPOL ® 1008/1,6-hexanediol/KOH | 6/5/1.2[10] |
| 62 | EMPOL ® 1008/1,6-hexanediol/KOH | 6/5/1.2[11] |
| 63 | EMPOL ® 1008/1,6-hexanediol/KOH | 6/5/1.2[12] |
| 64 | EMPOL ® 1008/1,6-hexanediol/KOH | 6/5/1.2[13] |

[3] 33 wt. % in Toluene
[4] 30 wt. % in ISOFOL ™ 16, a C16 Guerbet alcohol from Sasol
[5] 50 wt. % in TOMADOL ® 23-1, a nonionic surfactant from Tomah Products
[6] 25 wt. % in Toluene
[7] 50 wt. % in EXXAL ™ 13, a C13 alcohol from Exxon
[8] 50 wt. % in TOMADOL ® 23-3, a nonionic surfactant from Tomah Products
[9] 50% in SERDOX NOG200, a nonionic surfactant from Elementis Specialties Inc.
[10] 50% in NUOSPERSE ® FN260, a nonionic surfactant from Elementis Specialties Inc.
[11] 50% in NUOSPERSE ® FN265, a nonionic surfactant from Elementis Specialties Inc.
[12] 50% in SERDOX NOG440, a nonionic surfactant from Elementis Specialties Inc.
[13] 50% in TOMADOL ® 23-5, a nonionic surfactant from Tomah Products

TABLE 4

INDUSTRIAL ALKYD TOPCOAT FORMULATION (formulation A)

| RAW MATERIAL | POUNDS | GALLONS | BATCH |
|---|---|---|---|
| CHEMPOL ® 809-3068[1] | 171.20 | 20.62 | 85.60 |
| Xylene | 10.70 | 1.48 | 5.40 |
| Thixotrope | 10.00 | 1.20 | 5.00 |
| Mix 3 Mins. @ 3000 RPM | | | |
| DISPERSE AYD ® –1[2] | 6.30 | 0.78 | 3.15 |
| Mix 1 Min. @ 3000 RPM | | | |
| TI-PURE ® R-900 TiO$_2$[3] | 256.00 | 7.50 | 128.00 |
| Grind 15 Mins. @ 5000 RPM @ 130° F. | | | |
| Letdown: | | | |
| CHEMPOL ® 809-3068 | 482.60 | 58.16 | 241.30 |
| Xylene | 64.20 | 8.85 | 32.10 |
| 12% Co NUXTRA ®[2] | 1.34 | 0.15 | 0.67 |
| 24% Zr NUXTRA ®[2] | 2.66 | 0.26 | 1.33 |
| 10% Ca NUXTRA ®[2] | 1.60 | 0.19 | 0.65 |
| ASA #2 | 3.13 | 0.41 | 1.56 |
| BYK ® 301 | 3.21 | 0.40 | 1.61 |
| Total | 1012.94 | 100.00 | 506.37 |
| Weight Per Gallon: 10.13 | | | |
| PVC, %: 20.52 | | | |
| Solids, Wt., %: 58.62 | | | |
| Solids, Vol., %: 42.39 | | | |

[1] Manufactured by CCP
[2] NUXTRA ®COBALT 12%; NUXTRA ® ZIRCONIUM24% NUXTRA ® CALCIUM 10% all Manufactured by Elementis
[3] Manufactured by E.I. duPont de Nemours and Co.
[4] Acrylate-styrene-acrylonitrile interpolymer resin blended with a polymer of glycidyl (meth)acrylate
[5] Solution of a polyether modified polydimethylsiloxane.

TABLE 5

CHAIN STOPPED ALKYD WHITE HIGH SOLIDS AIR DRY ENAMEL (formulation B)

| RAW MATERIAL | POUNDS | GALLONS |
|---|---|---|
| 57-5720 Chain Stopped Alkyd @ 75% Solids (1)[1] | 242.72 | 28.06 |
| Ethylene Glycol n-Butyl Ether | 27.60 | 3.68 |
| Thixotrope | 10.00 | 0.74 |
| Mix 5 Mins. @ 3000 RPM | | |

TABLE 5-continued

CHAIN STOPPED ALKYD WHITE HIGH SOLIDS AIR DRY ENAMEL (formulation B)

| RAW MATERIAL | POUNDS | GALLONS |
|---|---|---|
| KRONOS ® 2310, TiO$_2$ | 368.05 | 10.77 |
| Grind 15 Mins. @ 5000 RPM | | |
| Letdown | | |
| 57-5720 Chain Stopped Alkyd, 75% Solids (1)$^2$ | 242.72 | 28.06 |
| Methyl n-Propyl Ketone | 147.04 | 21.90 |
| Ethylene Glycol n-Butyl Ether | 34.41 | 4.59 |
| 12% Co NUXTRA ®$^2$ | 1.55 | 0.18 |
| 6% Ca NUXTRA ®$^2$ | 3.07 | 0.39 |
| 18% Zr NUXTRA ®$^2$ | 4.07 | 0.44 |
| MULTIFLOW ® (2) | 7.36 | 0.94 |
| EXKIN ® #2 | 1.84 | 0.24 |
| Total | 1090.43 | 99.99 |
| Weight per Gallon, Pounds: 10.91 | | |

$^1$Manufactured by Reichhold Inc.
$^2$NUXTRA ® COBALT 12%; NUXTRA ® ZIRCONIUM 24% NUXTRA ® CALCIUM 10% all Manufactured by Elementis Manufactured by Elementis
$^3$Ethyl acrylate-2-ethy;hexyl acrylate copolymer.

TABLE 6

HIGH SOLIDS ACRYLIC BAKING ENAMEL (formulation C)

| RAW MATERIAL | POUNDS | GALLONS |
|---|---|---|
| Methyl Amyl Ketone | 35.00 | 5.25 |
| Butyl Acetate | 13.00 | 1.77 |
| JONCRYL ® 500 | 195.00 | 22.78 |
| Thixotrope | 5.00 | 0.60 |
| Mix 10 Mins. @ 3000 RPM then add: | | |
| TI-PURE ® R900 | 330.00 | 9.90 |
| Grind 20 Mins. @ 5000 RPM @ 125F., then add: | | |
| JONCRYL ® 500 | 264.90 | 30.95 |
| CYMEL ® 303 | 193.00 | 19.34 |
| Methyl Amyl Ketone | 32.00 | 4.80 |
| Butyl Acetate | 10.00 | 1.36 |
| NACURE ® 2501 | 5.00 | 0.61 |
| Mix 5 mins @ low speed | | |
| Total | 1082.90 | 97.36 |
| Weight per Gallon, Pounds: 11.12 | | |

After the paints were made, they were allowed to equilibrate at room temperature overnight, and the paint properties were measured as described below:

(1) Brookfield viscosities at 10 RPM were measured with a Brookfield Model RVT viscometer in accordance with ASTM D2196-81.

(2) Sag resistance was measured in mils using a Leneta Sag multi notch applicator at room temperature in accordance with ASTM D4400-84.

Aging studies were conducted after samples were aged for 7 days at 120° F.

TABLE 7 illustrates the performance of Examples 21–25b in Formulation A.

| | Initial | | Aged | |
|---|---|---|---|---|
| Example | Brookfield Viscosity cP 10 RPM | Leneta Sag. Mils | Brookfield Viscosity cP 10 RPM | Leneta Sag Mils |
| blank | 680 | 7.5 | 720 | 7.2 |
| 21 | 3840 | 18 | 2320 | 14 |
| 22 | 4640 | 20 | 2600 | 12 |
| 23 | 4040 | 18 | 2600 | 12 |
| 24 | 3160 | 16 | 1960 | 10 |
| 25 | 7200 | 25 | 4680 | 20 |
| 25b | 6960 | 25 | 4600 | 18 |

Table 7 demonstrates that the glycerol-based polyester salts of this invention (Examples 25 and 25b) are efficient thickeners, and provide increased rheological performance and sag, and reduced sag/viscosity drift on aging versus dimer fatty acid soaps (Examples 21-24).

Table 8 shows that the rheological performance of certain additives, of the present invention. In formulation A, the additives are relatively independent of the source of the dimer acid. In the more polar paint formulation B (Table 9), the material prepared with the PRIPOL® 1015 (containing approximately 20% of trimer acid), which is shown in example 14 exhibits rheological performance. All of the additives provide thickening.

TABLE 8

Performance of Examples Prepared by Process A in Formulation A

| | Initial | | Aged | |
|---|---|---|---|---|
| Example No. | Brookfield Viscosity cP 10 RPM | Leneta Sag. Mils | Brookfield Viscosity cP 10 RPM | Leneta Sag Mils |
| blank | 680 | 7.5 | 720 | 7.2 |
| 11 | 5750 | 28 | 3880 | 18 |
| 12 | 4960 | 28 | 3320 | 17 |
| 13 | 6640 | 30 | 4680 | 20 |
| 14 | 6680 | 30 | 4480 | 20 |
| THIXATROL ® MAX | 3880 | 20 | 7440 | 30 |
| THIXATROL ® 1104 | 700 | 8 | 740 | 7.5 |

THIXATROL ® MAX and THIXATROL ® 1104 are commercial rheological additives for non-aqueous formulations from Elementis Specialties Inc.

TABLE 9

Performance of Examples Prepared by Process A in Formulation B

| | Initial | | Aged | |
|---|---|---|---|---|
| Example No. | Brookfield Viscosity cP 10 RPM | Leneta Sag. Mils | Brookfield Viscosity cP 10 RPM | Leneta Sag Mils |
| blank | 280 | 8 | 280 | 7 |
| 11 | 430 | 8 | 520 | 8 |
| 12 | 390 | 8 | 450 | 7 |
| 13 | 780 | 12 | 840 | 10 |
| 14 | 1460 | 12 | 1310 | 12 |
| THIXATROL ® P200X | 1590 | 14 | 1940 | 14 |

THIXATROL ® P200X is a commercial rheological additive for non-aqueous formulations, available from Elementis Specialties Inc.

Table 10 shows that the performance of the polyesters may be system-dependent. The Table shows that the diol-based polyesters (Examples 28, 34 and 35) show performance in formulation B, while the glycerol-based Example 4 does not. Note that the hexanediol-based materials show performance regardless of the method of preparation (compare Example 28 vs. 34).

TABLE 10

Performance of Examples Prepared by Process B in Formulation B

|  | Initial | | Aged | |
|---|---|---|---|---|
| Example No. | Brookfield Viscosity cP 10 RPM | Leneta Sag. Mils | Brookfield Viscosity cP 10 RPM | Leneta Sag Mils |
| blank | 320 | 7 | 320 | 7 |
| 4 | 320 | 8 | 440 | 7 |
| 34 | 14400 | 35 | 7680 | 33 |
| 35 | 12600 | 45 | 6480 | 28 |
| 28 | 9160 | 25 | 6840 | 28 |
| THIXATROL ® 1104 | 720 | 8.5 | 720 | 9 |
| THIXATROL ® P200X | 2680 | 14 | 2760 | 15 |

A sample of a glycerol/dimer acid, dimethyl ester from Arizona Chemical (DADM)/$K_2CO_3$ polyester was dissolved in iso-propyl alcohol (IPA) and concentrated in vacuo to give an 81% solids material. A second sample of the glycerol/DADM/$K_2CO_3$ polyester was dissolved in IPA and neutralized with a 0.1 N solution of HCl in IPA before being concentrated in vacuo to afford an 88% solids sample. The KCl that formed upon neutralization was removed by filtration before the sample was concentrated. The physical properties of the compositions tested in Formulation A are shown in Table 11. Table 12 illustrates the importance of the potassium carboxylate groups of the glycerol-based polyester additives. When these groups are neutralized with HCl, the rheological performance is lost.

TABLE 11

| Example No. | composition | ratio | Acid Value | Amine Value |
|---|---|---|---|---|
| 31 | Glycerol/DADM $K_2CO_3$, 50% in Tween 85 | 1/1.79/0.17 | N.D. | 27.9 |
| 32 | Glycerol/DADM $K_2CO_3$, 50% in Tween 85 | 1/1.79/0.17 | 28.1 | 0.4 |

TABLE 12

Performance of Examples of Table 10 in paint formulation A

| | shear (RPM) | | | | | | T.I.* | T.I. |
|---|---|---|---|---|---|---|---|---|
| Example No. | 100 | 50 | 20 | 10 | 5 | 2.5 | 5/50 | 10/100 |
| 31 | | 1334 | 1735 | 2280 | 3000 | 3680 | 2.25 | |
| 32 | | 1046 | 1225 | 1230 | 1100 | 840 | 1.05 | |

*T.I. = Thixotropic index

TABLE 13

Performance of experimental compositions in formulation C

| | Initial | | Aged | |
|---|---|---|---|---|
| Example No. and Loading Level | Brookfield Viscosity cP 10 RPM | Leneta Sag. Mils | Brookfield Viscosity cP 10 RPM | Leneta Sag Mils |
| blank | 520 | 1 | 560 | 1 |
| 4; 0.46% NV by wt | 5360 | 25 | 4560 | 20 |
| 34; 0.46% NV by wt | 7640 | 35 | 6800 | 30 |
| 35; 0.46% NV by wt | 4960 | 18 | 5120 | 16 |
| 28; 0.46% NV by wt | 7120 | 35 | 6200 | 30 |
| 28; 0.5% NV by wt | 8120 | 33 | 7000 | 33 |
| 28; 0.3% NV by wt | 6480 | 25 | 5880 | 22 |
| 28; 0.1% NV by wt | 3440 | 8 | 3600 | 9 |
| THIXATROL ® MAX 0.46% NV by wt | 1120 | 1 | 2880 | 3 |
| THIXATROL ® 1104 0.46% NV by wt | 5200 | 18 | 3520 | 15 |

Table 13 shows the improve efficiency of the polyester-based materials for a loading level as low as 0.1% NV by wt.

Table 14 illustrates the effects of different basic compounds on the performance of the glycerol based polyester compositions. The examples were evaluated in Formulation A, and clearly demonstrate that bases of calcium, potassium and cesium are particularly effective for increasing the efficiency of the rheological additives of the present invention.

TABLE 14

Effect of Base Identity of Example Efficiency

| | Initial | | Aged | |
|---|---|---|---|---|
| Example No. | Brookfield Viscosity cP 10 RPM | Leneta Sag. Mils | Brookfield Viscosity cP 10 RPM | Leneta Sag Mils |
| 4 | 3400 | 13 | 2400 | 10 |
| 5 | 1960 | 8.5 | 1400 | 8.7 |
| 6 | 4000 | 14 | 2800 | 11 |
| 7 | 720 | 7 | 800 | 7.9 |
| 8 | 600 | 6 | 720 | 7.9 |
| 13 | 6640 | 30 | 4680 | 20 |
| 15 | 4320 | 20 | 3520 | 18 |
| 51 | 1000 | ND | ND | ND |
| 53 | 2430 | ND | ND | ND |
| 54 | 1290 | ND | ND | ND |
| 55 | 540 | ND | ND | ND |
| THIXATROL ® MAX | 3880 | 20 | 7440 | 30 |

Table 14 shows that the nature of the base plays an important role in the final performance of the additive in the paint formulation. Potassium and cesium show good rheological performance, while aluminum, sodium, magnesium, and lithium show less performance but still act as rheological additives and provide thickening. The table shows also that bases such as potassium stearate (example 15) can be used as a base and that a decrease in glycerol from 1.7 to 1.4 equivalent will lead to a further increase in rheological performance (see example 13). Further, it can be seen that the polyester additives give a decrease in rheological performance upon aging, while the THIXATROL® MAX gives an increase. Generally the polyester derivatives of the present invention show less viscosity drift upon aging than the THIXATROL® MAX comparative example.

Table 15 illustrates the effect of the KOH/COOH mole ratio on the performance of 1,6-hexanediol/dimer acid based polyester compositions when tested in Formulation B.

TABLE 15

| KOH/COOH | EMPOL ® 1008/ 1,6- hexanediol | Brookfield Viscosity cP, 10 RPM | Leneta Sag Mils |
|---|---|---|---|
| 0 | 2:1 | 3208 | 12 |
| 0 | 6:5 | 12040 | 35 |
| 0 | 18:17 | 7040 | 20 |
| 0.15 | 2:1 | 6640 | 20 |
| 0.15 | 6:5 | 12500 | 35 |
| 0.15 | 18:17 | 7120 | 23 |
| 0.6 | 2:1 | 6720 | 25 |
| 0.6 | 6:5 | 12880 | 35 |
| 0.6 | 18:17 | 7680 | 24 |
| 1.0 | 2:1 | 7840 | 30 |
| 1.0 | 6:5 | 13360 | 35 |
| 1.0 | 18:17 | 7880 | 25 |

Table 15 shows that there is an certain molecular weight (as determined by GPC) for the hexanediol-based polyester rheological additives at which a preferred rheological performance is obtained (the MW of the polyester additives increases from 2:1<6:5<18:17; and a preferred MW in this series seems to be for the 6:5 ratio of dimer acid to diol). The degree of neutralization (from 0 to 0.15 to 0.6 to 1.0 equivalents of KOH per remaining carboxylic acid group) seems to marginally increase the rheological performance of certain additives of the present invention. Thus, in the case of hexanediol-based polyester rheological additives, neutralization is not required for rheological performance. Neutralization did improve the compatibility of the additive with the nonionic diluent employed.

Table 16 illustrates an effect of different diluents on the performance of the 1,6-hexanediol/dimer acid based polyester compositions. Examples were evaluated in Formulation B. These results indicate that, while the selection of diluent has some effect on the efficiency of the additive, all nonionic surfactant diluents produce efficient additives.

TABLE 16

| | Initial | | Aged | |
|---|---|---|---|---|
| Example No. | Brookfield Viscosity cP 10 RPM | Leneta Sag. Mils | Brookfield Viscosity cP 10 RPM | Leneta Sag Mils |
| blank | 680 | 8 | 740 | 8 |
| 34 | 9000 | 30 | 3800 | 16 |
| 60 | 10080 | 25 | 4080 | 16 |
| 61 | 8520 | 25 | 3360 | 14 |
| 62 | 8480 | 25 | 3440 | 15 |
| 63 | 7480 | 29 | 3280 | 18 |
| 64 | 9240 | 25 | 3720 | 15 |

The present invention may be embodied in other specific forms without departing from the spirit or essential attributes of the invention. Accordingly, reference should be made to the appended claims, rather than the foregoing specification, as indicated the scope of the invention. Although the foregoing description is directed to a preferred embodiments of the invention, it is noted that other variations and modification will be apparent to those skilled in the art, and may be made without departing from the spirit or scope of the invention.

What is claimed:

1. A non-aqueous fluid system comprising: a rheological additive comprising: one or more polyesters comprised of the reaction products of: one or more polyols having at least two hydroxyl moieties; and one or more polycarboxylic acids having at least two carboxylic acid moieties; and one or more basic compounds, wherein said polyesters have at least two active carboxylic acid moieties as end groups and at least a portion of said carboxylic acid moieties are in the carboxylate anion form; and one or more particulate materials, wherein said polyester rheological additive imparts thixotropy to said system.

2. The non-aqueous fluid system of claim 1, wherein said basic compound is selected from the group consisting of: alkali metal bases, alkaline earth bases and amines.

3. The non-aqueous fluid system of claim 1, wherein said polyol comprises glycerol.

4. The non-aqueous fluid system of claim 1, wherein said polycarboxylic acids comprise a polycarboxylic acid having from 18 to 54 carbon atoms.

5. The non-aqueous fluid system of claim 1, wherein said polycarboxylic acid comprises one of the following: a dimer acid having 32 to 36 carbon atoms, a trimer acid having 48 to 54 carbon atoms, and mixtures thereof.

6. The non-aqueous fluid system of claim 1, wherein said polycarboxylic acid has from 2 to 6 carboxylic acid moieties.

7. The non-aqueous fluid system of claim 1, wherein said polyester has a hydroxyl moiety to carboxylic acid moiety ratio ranging from 1.8:1 to 3.0:1.

8. The non-aqueous fluid system of claim 1, wherein said rheological additive further comprises a liquid diluent.

9. The non-aqueous fluid system of claim 2, wherein said one or more basic compounds comprises potassium hydroxide.

10. The non-aqueous fluid system of claim 8, wherein said diluent for said rheological additive is selected from the group consisting of: toluene, xylene, diethylene glycol butyl ether, butyl triglycol, hexyl triglycol, N-methyl pyrrolidone, ethyl acetate, butyl acetate, methyl ethyl ketone, and butanol, polyethylene oxides monoethers, polyethylene oxides monoesters, triglycerides, oils and high boiling alcohols, nonionic surfactants and mixtures thereof.

11. The non-aqueous system of claim 1, wherein said particulate material comprises one of the following: titanium dioxide, calcium carbonate, talc, alumina, layered silicates, fumed silica, pigments, and mixtures thereof.

12. A non-aqueous fluid system comprising: a rheological additive comprising: one or more polyesters comprised of: one or more polyols having at least two hydroxyl moieties; and one or more polycarboxylic acids having at least two carboxylic acid moieties; wherein said polyester has at least two active carboxylic acid moieties as end groups wherein at least a portion of said active carboxylic acid moieties are in the carboxylate anion form; and one or more particulate materials, wherein said polyester rheological additives impart thixotropy to said system.

13. The non-aqueous fluid system of claim 12, wherein a portion of said active carboxylic acid moieties of said polyester rheological additive have been converted to carboxylate anion moieties by reaction with one or more basic compounds selected from the group consisting of alkali bases, alkaline earth bases and amines.

14. The non-aqueous fluid system of claim 12, wherein said polycarboxylic acid of said polyester rheological additive comprises 1,6-hexanediol.

15. The non-aqueous fluid system of claim 12, wherein said polycarboxylic acid of said polyester rheological additive has from 18 to 54 carbon atoms.

16. The non-aqueous fluid system of claim 12, wherein said polycarboxylic acid of said polyester rheological additive comprises one of the following: a dimer acid having 32 to 36 carbon atoms, a trimer acid having 48 to 54 carbon atoms, and mixtures thereof.

17. The non-aqueous fluid system of claim 12, wherein said polycarboxylic acid of said polyester rheological additive has from 2 to 6 carboxylic acid moieties.

18. The non-aqueous fluid system of claim 12, wherein said polyester of said polyester rheological additive has a hydroxyl moiety to carboxylic acid moiety ratio ranging from 0.5:1 to 0.9:1.

19. The non-aqueous fluid system of claim 12, wherein said polyester rheological additive further comprises a liquid diluent.

20. The non-aqueous fluid system of claim 13, wherein said one or more basic compounds comprises potassium hydroxide.

21. The non-aqueous fluid system of claim 19, wherein said diluent, of said polyester rheological additive, is selected from the group consisting of: toluene, xylene, diethylene glycol butyl ether, butyl triglycol, hexyl triglycol, N-methyl pyrrolidone, ethyl acetate, butyl acetate, methyl ethyl ketone, and butanol, polyethylene oxides monoethers, polyethylene oxides monoesters, triglycerides, oils and high boiling alcohols, nonionic surfactants and mixtures thereof.

* * * * *